(12) United States Patent
Kaelberer et al.

(10) Patent No.: US 11,644,348 B2
(45) Date of Patent: May 9, 2023

(54) OPTICAL POSITION MEASURING DEVICE

(71) Applicant: DR. JOHANNES HEIDENHAIN GmbH, Traunreut (DE)

(72) Inventors: Thomas Kaelberer, Schrobenhausen (DE); Wolfgang Holzapfel, Obing (DE)

(73) Assignee: DR. JOHANNES HEIDENHAIN GMBH, Trauntreut (DE)

( * ) Notice: Subject to any disclaimer, the term of this patent is extended or adjusted under 35 U.S.C. 154(b) by 180 days.

(21) Appl. No.: 17/164,867

(22) Filed: Feb. 2, 2021

(65) Prior Publication Data

US 2021/0255008 A1 Aug. 19, 2021

(30) Foreign Application Priority Data

Feb. 19, 2020 (DE) ...................... 10 2020 202 080.9

(51) Int. Cl.
*G01D 5/38* (2006.01)
*G01B 11/00* (2006.01)
*G01D 5/347* (2006.01)

(52) U.S. Cl.
CPC ............... *G01D 5/38* (2013.01); *G01B 11/00* (2013.01); *G01B 11/005* (2013.01); *G01D 5/34715* (2013.01); *G01D 5/34746* (2013.01)

(58) Field of Classification Search
CPC .. G01D 5/38; G01D 5/34715; G01D 5/34746; G01B 11/00; G01B 11/005
See application file for complete search history.

(56) References Cited

U.S. PATENT DOCUMENTS

| | | | |
|---|---|---|---|
| 7,573,581 B2 | 8/2009 | Holzapfel | |
| 7,796,272 B2 | 9/2010 | Holzapfel | |
| 7,907,286 B2 | 3/2011 | Holzapfel | |
| 8,822,907 B2 | 9/2014 | Joerger et al. | |

(Continued)

FOREIGN PATENT DOCUMENTS

| | | | |
|---|---|---|---|
| DE | 102015203188 A1 | 8/2016 | |
| DE | 102016210434 A1 | 12/2017 | |

(Continued)

OTHER PUBLICATIONS

English machine translation of DE 10 2016 210434 (Year: 2016).*

*Primary Examiner* — Dominic J Bologna
(74) *Attorney, Agent, or Firm* — Leydig, Voit & Mayer, Ltd.

(57) ABSTRACT

An optical position measuring device for recording a relative position of two scales includes the scales. The longitudinal extents of the scales are oriented parallel to a first and second measuring direction. A horizontal plane of movement is spanned by these measuring directions. A light source is configured to emit an illumination beam that is split into at least two sub-beam bundles at the first scale. The sub-beam bundles subsequently impinge on the second scale, which is tilted about the direction of the longitudinal extent thereof relative to the horizontal plane of movement, and are back-reflected to impinge again on the first scale and are recombined there such that a resulting signal beam is subsequently propagated toward a detection unit, via which phase-shifted scanning signals are generatable with respect to a relative movement of the scales along a third perpendicular measuring direction and the first or second measuring direction.

16 Claims, 8 Drawing Sheets

(56) References Cited

U.S. PATENT DOCUMENTS

2010/0328681 A1* 12/2010 Kapner .............. G01D 5/34715
                                                        356/616
2016/0245642 A1* 8/2016 Holzapfel ................ G01D 5/38
2019/0120609 A1* 4/2019 Holzapfel ................ G01D 5/38

FOREIGN PATENT DOCUMENTS

| DE | 102017219125 A1 | 4/2019 |
| EP | 1019669 B1 | 7/2002 |
| EP | 1762828 A2 | 3/2007 |
| EP | 2450673 A2 | 5/2012 |
| WO | 2008138501 A1 | 11/2008 |

* cited by examiner

OPTICAL POSITION MEASURING DEVICE

CROSS-REFERENCE TO PRIOR APPLICATIONS

Priority is claimed to German Patent Application No. DE 10 2020 202 080.9, filed on Feb. 19, 2020, the entire disclosure of which is hereby incorporated by reference herein.

FIELD

The present invention relates to an optical position measuring device suited for the high-accuracy position measurement of two objects that are mutually movable along at least two measuring directions. In this case, the two objects are each connected to scales.

BACKGROUND

Optical position measuring devices based on interferential scanning principles are known where an illumination beam is split by diffraction at a measuring graduation of a scale into different sub-beam bundles. Once suitable sub-beam bundles are combined, periodic signals are generated in a detection unit in response to a displacement of the scale relative to another scale due to the interference of the two sub-beam bundles. By counting the signal periods in the detection unit, it is possible to infer the extent of the displacement of the two scales, that is of the objects connected to the scales.

Optical position measuring devices of this kind are used, for example, for high-accuracy position measurement in the semiconductor industry where, for instance, photolithography exposure masks are moved relative to a wafer at velocities of more than one meter per second; positioning accuracies within the range of a few nanometers and below must thereby be maintained. A decisive advantage of grating-based position measuring devices over interferometers is that the interfering sub-beam bundles only need to travel very short distances. Thus, they are hardly affected by environmental influences, such as fluctuations in air pressure, in temperature and in moisture, which could falsify the measurement, for example, because of a fluctuating refractive index of the air.

International Patent Application No. WO 2008/138501 A1 describes an optical position measuring device, which includes two crossed scales, which each have measuring graduations that include periodically arrayed lines, respectively grating regions disposed transversely to the common measuring direction. Such a position measuring device can be used to record the position of a table that is movable in two directions along a first measuring direction x, independently of the position of the table along another, second measuring direction y. If two such mutually orthogonally disposed position measuring devices are used, the position of the table can also be measured along second measuring direction y, this time independently of the position of the table along the first measuring direction x. The drawback of the position measuring device described in International Patent Application No. WO 2008/138501 A1 is that movements of the table at right angles to the table plane, respectively horizontal plane of movement along a further, third measuring direction z cannot be determined metrologically.

To record the position of a table in the table plane along the first and second measuring directions x, y, position measuring devices having scales are also known, which have two-dimensional measuring graduations in the form of cross gratings, which are scanned at a plurality of points, so that lateral displacements, as well as rotations in the table plane can be determined metrologically. With regard to position measuring devices of that kind, European Patent No. EP 1 019 669 B1 discusses using additional distance sensors that are also able to record movements at right angles to the table plane, thus along third measuring direction z and consequently all six degrees of freedom of movement of the table. However, the distance sensors provided in this case, such as contact-type or capacitive measuring probes, for example, do not meet the accuracy requirements of current and future production facilities in the semiconductor industry. In addition, high-accuracy, extended cross gratings are expensive to produce.

European Patent Application No. EP 1 762 828 A2 describes an optical position measuring device which, besides a measurement along a primary, horizontal measuring direction x, additionally permits a measurement of the scanning distance at right angles to the measuring direction x, thus a position measurement along the measuring direction z, between a scale and a scanning unit that includes further components of the position measuring device. This is synonymous with the measurement of an additional degree of freedom of movement along vertical measuring direction z. In this regard, a light beam, transmitted through a transparent scanning reticle having various optical structures, impinges on a reflective measuring graduation of the scale. The light, which is split into two sub-beam bundles, then travels back and forth a plurality of times between the scanning reticle and the scale. Relative to a plane, the sub-beams of a sub-beam bundle thereby propagate asymmetrically, perpendicularly to horizontal measuring direction x, and have different path lengths. Along the scanning beam path, the sub-beam bundles interact with different optically active structures, such as, for example, gratings for splitting or combining light beams of different orders of diffraction, as well as mirrors for reflecting and lenses for selectively deflecting light. Ultimately, those sub-beam bundles are combined that mutually interfere and thus generate periodic scanning signals in a plurality of photodetectors of a detection unit in response to a relative movement between the scale and the scanning unit. Due to the asymmetric path of the sub-beam bundles, periodic scanning signals are obtained in the detection unit, from which both the horizontal and the vertical displacement of the scale and scanning unit are readily discernible, and thus the relative displacement of the two objects, which are movable relative to one another, along the two measuring directions x and z. Because of the structure of the scanning reticle of the position measuring device described in European Patent Application No. EP 1 762 828 A2, however, it cannot be used for systems having crossed scales, as were described above. The scanning reticle cannot be expanded into a second scale, relative to which the first scale could move transversely to the measuring direction, without interfering with the measurement.

For that reason, European Patent Application No. EP 2 450 673 A2 provides an optical position measuring device that includes a scanning bar having a first grating-like measuring graduation and a scale having a second grating-like measuring graduation, the scanning bar extending in a first or second of two measuring directions x, y, and the scale extending in the respective other of the two measuring directions y, x. In a third measuring direction z, the scale is thereby perpendicularly offset to the first and second measuring direction by a scanning distance to the scanning bar.

In addition, the optical position measuring device has a light source which emits an illumination beam that pierces the first measuring graduation on the scanning bar at a crossing point of the scanning rod and scale, to impinge on the second measuring graduation on the scale and, from there, back to the scanning bar, continuing to a detection unit. The light is thereby split by diffraction at optically active structures of the scanning rod and the scale into different sub-beam bundles, and recombined, a periodic signal resulting in the detection unit due to the interference of combined sub-beam bundles in response to a displacement between the scanning bar and the scale along the first measuring direction x. The optical position measuring device is designed here in such a way that periodic signals can likewise be generated in the detection unit in the case of a change in the scanning distance between the scanning bar and the scale along third measuring direction z. This optical position measuring device currently makes it possible for relative movements to be recorded along at least two measuring directions x, z, but it is not independent of possible fluctuations in the light wavelength; such fluctuations can result, for example, from changes in temperature and/or humidity in the ambient air and can cause errors when determining the position-dependent scanning signals.

SUMMARY

In an embodiment, the present invention provides an optical position measuring device for recording a relative position of two scales, which are mutually movable along a plurality of measuring directions and/or which are disposed in different planes and mutually crossed. The two scales each have a measuring graduation that includes periodically arrayed grating regions having different optical properties. Directions of longitudinal extent of the scales are oriented parallel to a first and second measuring direction. A horizontal plane of movement is spanned by the first and second measuring directions. A third measuring direction is oriented perpendicularly to the first and second measuring directions. A light source is configured to emit an illumination beam that is split into at least two sub-beam bundles at a first one of the two scales. The sub-beam bundles subsequently impinge on a second one of the two scales, which is tilted about the direction of the longitudinal extent thereof relative to the horizontal plane of movement. The sub-beam bundles are back-reflected toward the first scale at the second scale. The back-reflected sub-beam bundles impinge again on the first scale and are recombined at the first scale such that a resulting signal beam is subsequently propagated in a direction of a detection unit, via which a plurality of phase-shifted scanning signals are generatable with respect to a relative movement of the scales along the third measuring direction and the first or second measuring direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
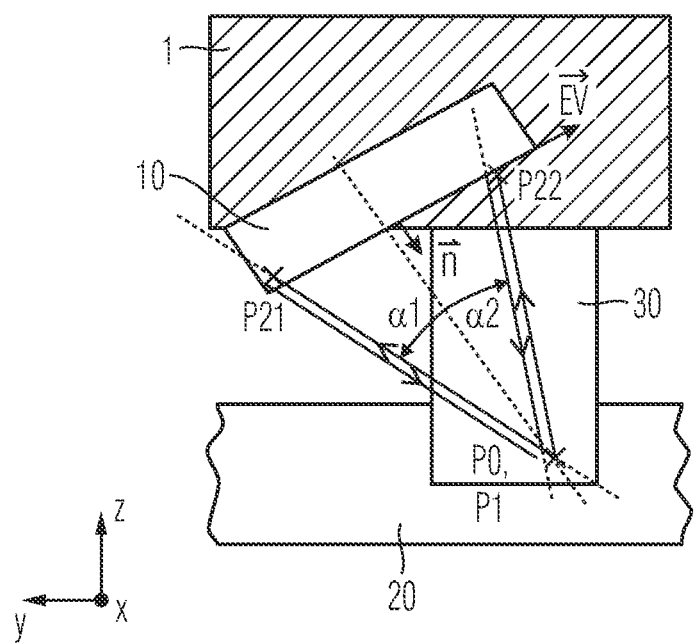
FIGS. 1a, 1b each show a schematic sectional view including the scanning beam path of a first exemplary embodiment of the optical position measuring device according to the present invention.

In an embodiment, the present invention provides a highly accurate optical position measuring device having crossed scales which, besides at least one position measurement along a measuring direction parallel to the direction of the longitudinal extent of one of the scales, also makes possible a position measurement along another measuring direction, which is oriented perpendicularly to the two scales.

The optical position measuring device according to an embodiment of the present invention is used for recording the relative position of two scales which are mutually movable along a plurality of measuring directions and/or disposed in different planes and mutually crossed. In this case, the two scales each have a measuring graduation having periodically arrayed grating regions having different optical properties. The directions of longitudinal extent of the scales are oriented parallel to a first and second measuring direction, a horizontal plane of movement being spanned by the first and second measuring direction; a third measuring direction being oriented perpendicularly to the first and second measuring direction. At the first scale, an illumination beam emitted by a light source is split into at least two sub-beam bundles. The sub-beam bundles subsequently impinge on the second scale, which is tilted about the direction of the longitudinal extent thereof relative to the horizontal plane of movement. At the second scale, the sub-beam bundles are back-reflected toward the first scale. The back-reflected sub-beam bundles impinge again on the first scale and are recombined there, so that a resulting signal beam is subsequently propagated in the direction of a detection unit, via which a plurality of phase-shifted scanning signals may be generated with respect to the relative movement of the scales along the third measuring direction and the first or second measuring direction.

The second scale is preferably tilted about the direction of the longitudinal extent thereof relative to the horizontal plane of movement in such a way that, in the plane spanned by the sub-beam bundle split at the first scale, the bisector between the split sub-beam bundles is perpendicular to the connecting line between the points of incidence of the sub-beam bundles at the second scale.

In one possible specific embodiment, the two measuring graduations on the scales are each in the form of reflection phase gratings, which have periodically arrayed grating regions having different phase-shifting effects.

The two scales may thereby each include a carrier body upon which the measuring graduations are disposed; the carrier body being made of a material having a thermal expansion coefficient of $CTE \approx 0$.

In addition, at least one of the two measuring graduations may be in the form of a geometric phase grating that polarizes the two sub-beam bundles mutually orthogonally.

Furthermore, the measuring graduation of the second scale may be configured as a Littrow grating, so that:
either the sub-beam bundles, which are incident thereto, are back-reflected opposite to the direction of incidence,
or the sub-beam bundles, which are projected onto a plane spanned by a normal to the second measuring graduation and the direction of diffraction of the first measuring graduation, are back-reflected opposite to the direction of incidence.

The directions of longitudinal extent of the first and second scales are advantageously oriented mutually orthogonally.

One possible specific embodiment provides that:
along the direction of the longitudinal extent thereof, the first scale have a length that corresponds to the displacement path of the first scale along the associated measuring direction thereof, and
along the direction of the longitudinal extent thereof, the second scale have a length that corresponds to the displacement path of the first scale along the associated measuring direction.

Alternatively, it is possible that:
along the direction of the longitudinal extent thereof, the first scale has a length that corresponds to the displacement path of the second scale along the associated measuring direction thereof; and
along the direction of the longitudinal extent thereof, the second scale has a length that corresponds to the displacement path of the second scale along the associated measuring direction.

It may be provided that the light source and the detection unit be jointly located in a scanning head.

It is thereby possible that:
the scanning head be connected to the second scale, and that the first scale be disposed relatively movably relative to the scanning head along the first, second, and third measuring directions, and
that the first scale be tilted about the direction of the longitudinal extent thereof relative to the horizontal plane of movement.

In addition, the signal beam may thereby be oriented antiparallel to the illumination beam.

In another specific embodiment, it may be provided that:
the scanning head be neither connected to the first nor to the second scale and be movably disposed relative to the first scale along the first measuring direction, and
the second scale be disposed relatively movably relative to the first scale along the second and third measuring directions.

It is also possible that:
the scanning head be connected to the first scale, and
the second scale be disposed relatively movably relative to the scanning head along the first, second, and third measuring directions (x, y, z).

Alternatively, it may additionally be provided that:
the scanning head be neither connected to the first nor to the second scale and be disposed movably relative to the second scale along the first measuring direction, and
the first scale be disposed relatively movably relative to the second scale along the second and third measuring directions.

Finally, it is possible that a manufacturing device be designed to include four position measuring devices according to an embodiment of the present invention,
the manufacturing device including a tool and a table that is movably disposed relative to the tool along the three measuring directions, and
the scanning heads and the second scale of the position measuring devices being each connected to the tool, and
the first scale of the position measuring devices being connected in each particular case to the table,
so that, from the scanning signals of the position measuring devices, it is possible to determine the spatial position of the table relative to the tool in all six spatial degrees of freedom.

By applying the inventive measures, a highly accurate position measurement may be performed at this stage in an optical position measuring device having crossed scales along a further measuring direction that is oriented perpendicularly to the two scales. Thus, for example, the movement of a table in a manufacturing device for semiconductor manufacturing may be determined metrologically in all six degrees of freedom of movement.

In an advantageous specific embodiment, the position measurement is additionally independent of possible fluctuations of the light wavelength which can be caused, for instance, by a change in air temperature or air humidity. This lessens the demands placed on the light source to be used with regard to coherence properties and drift behavior, i.e., the use of inexpensive light sources is possible.

Moreover, the number and mass of the required components of the position measuring device on the movable object, for example, the table of a manufacturing device, may be kept to a minimum. This results in a lower degree of complexity of the corresponding device.

Other details and advantages of the present invention are explained on the basis of the following description of exemplary embodiments of the device according to the present invention in conjunction with the figures.

DETAILED DESCRIPTION

Before specific exemplary embodiments of the optical position measuring device as well as a manufacturing device having a plurality of such position measuring devices are described in the following, basic theoretical considerations will first be clarified with reference to FIGS. 9a, 9b.

Figure 9A:
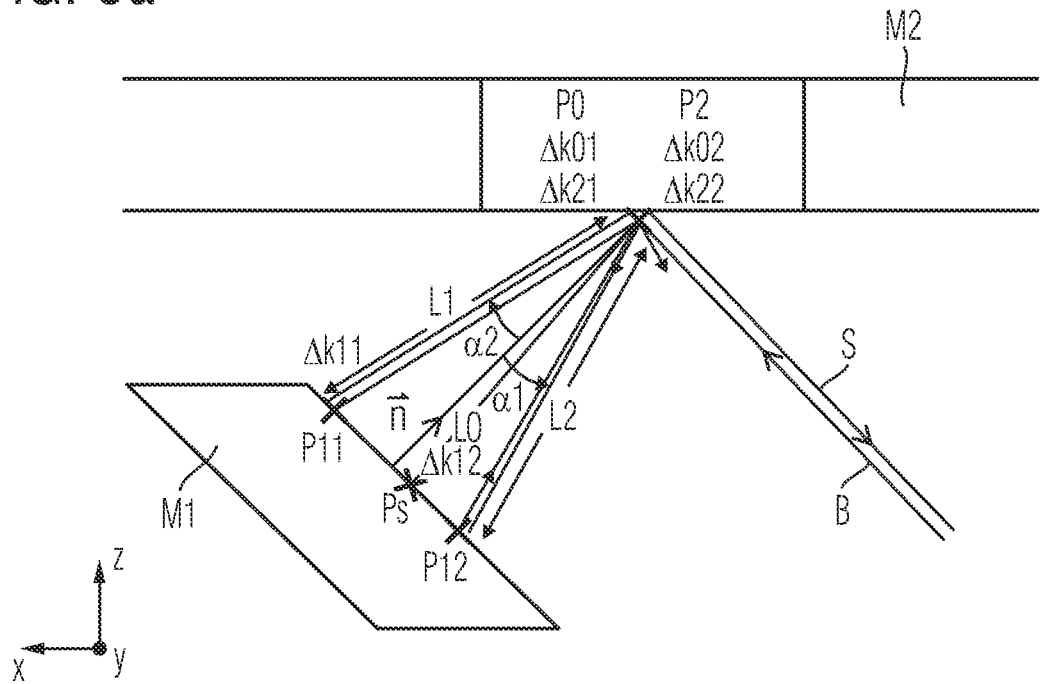
FIGS. 9a, 9b each show a schematic sectional view including the scanning beam path portion of another exemplary embodiment of the optical position measuring device according to the present invention.
Figure 9B:
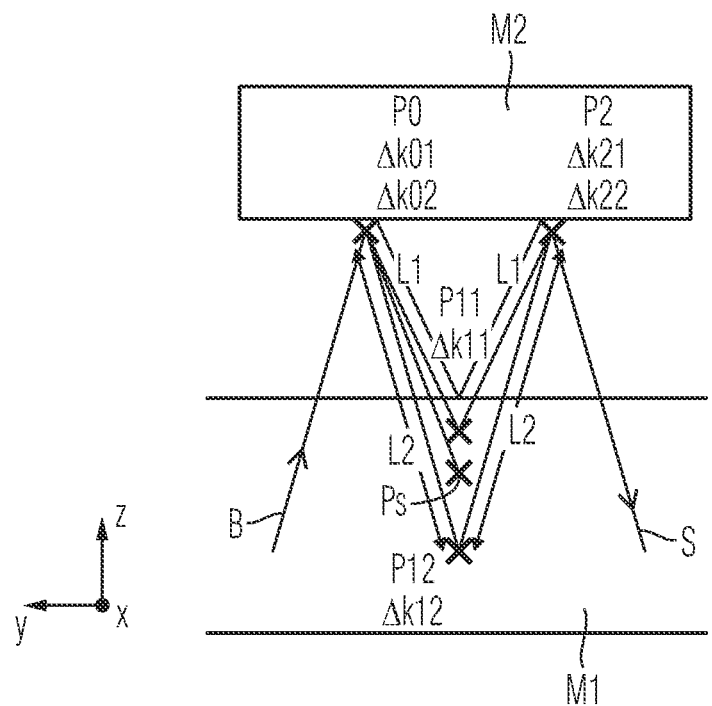

FIGS. 9a, 9b show different sectional views of portions of the scanning beam path of an optical position measuring device according to an embodiment of the present invention having two crossed scales M1, M2. Scales M1, M2 are mutually movably disposed in different planes along a plurality of measuring directions x, y, z. With the aid of the position measuring device, the relative position of scales M1, M2 is recorded along at least two different measuring directions x, y, z. Connected, in practice, to the two scales M1, M2 are mutually movable objects, whose relative position is to be determined in a plurality of spatial degrees of freedom, for example, corresponding machine components; these objects are not shown in the figures. A downstream machine control may use the scanning signals generated by the inventive position measuring device to appropriately position the corresponding machine components.

The two scales M1, M2 each have a measuring graduation, respectively grating having periodically arrayed grating regions having different optical properties; for the sake of clarity, the measuring graduations are not shown in FIG. 9a, 9b. The directions of longitudinal extent of scales M1 and M2 are oriented parallel to second and first measuring directions y, x, a horizontal plane of movement being spanned by first and second measuring directions x, y. Third measuring direction z is oriented orthogonally, respectively vertically to the first and second measuring directions x, y.

At first scale M2, an illumination beam B emitted by a light source (not shown in the figures) is split into at least two sub-beam bundles. The sub-beam bundles subsequently impinge on second scale M1, which, relative to the horizontal plane of movement, is tilted about the direction of the longitudinal extent thereof, which, here, is oriented in the y direction. At second scale M1, the sub-beam bundles are back-reflected toward first scale M2. The back-reflected sub-beam bundles impinge again on first scale M2 and are recombined there, so that a resulting signal beam S subsequently propagates in the direction of a detection unit (likewise not shown). Via these, a plurality of phase-shifted scanning signals may be generated in response to the relative movement of scales M1, M2 along third measuring direction z as well as first or second measuring direction x, y.

Thus, with the aid of optical position measuring devices of this kind, the relative change in position between the two scales M1, M2 having the measuring graduations disposed thereon is measured. To be able to realize the largest possible travel range in the horizontal xy plane of movement, first scale M2 must be extended in this plane. To ensure an achromatic, i.e., wavelength-independent position measurement, the scanning beam paths of the two sub-beam bundles must have the same optical path length between splitting and recombination.

If second scale M1, upon which the split sub-beam bundles impinge, is tilted about the direction of longitudinal extent y thereof, as shown in FIG. 9a, 9b, the measuring direction in the horizontal plane of movement may be freely selected; at the same time, a measurement sensitivity is ensured with regard to relative movements along vertical measuring direction z. This means that, besides information on the relative movement along a measuring direction x or y, the generated scanning signals also contain information on a relative movement along third measuring direction z. Moreover, if the bisector between the two split sub-beam bundles is thereby oriented as a normal n perpendicularly to the plane of the scale upon which the two split sub-beam bundles impinge, then the path length equality for the two sub-beam bundles is ensured, and the scanning is achromatic, i.e., insensitive to possible wavelength fluctuations, as will be illustrated below.

If a beam is diffracted at an optical diffractive grating, it then undergoes a directional change $\Delta \vec{k}$ in proportion to the gradient of phase $\vec{\nabla} \Phi$ of the grating. m thereby indicates the order of diffraction of the grating:

$$\Delta \vec{k} = -m \cdot \vec{\nabla} \Phi$$

If a first linear grating is displaced in the x direction by amount $\Delta \vec{x}$ relative to a second grating, then position phase $\Phi$ of the sub-beam bundle changes at the first grating by:

$$\Delta \Phi = \Delta \vec{k} \cdot \Delta \vec{x}.$$

From this, it is apparent that when the second grating is displaced by displacement amount $\Delta \vec{x}$, position phase $\Phi$ of the position measuring device changes by $$\Delta \Phi = \Sigma_I \Delta \vec{k}_{2I} \cdot \Delta \vec{x} + \Sigma_I \Delta \vec{k}_{1I} \cdot \Delta \vec{x}.$$

In this relation, the particular first index indicates first or second diffraction branch L1, L2 in accordance with FIGS. 9a, 9b; index I denotes the grating contact of the particular diffracted sub-beam bundle.

Thus, it follows, in turn, that $\Delta \Phi \neq 0$ holds, and there is, consequently, a sensitivity to a change in position along direction z in the case that $$(\Sigma_I \Delta \vec{k}_{2I} + \Sigma_I \Delta \vec{k}_{1I})_z \neq 0$$

and $$\Delta \vec{x} = (0, 0, \Delta z)$$

are satisfied.

Accordingly, in order that a grating-based position measuring device have a sensitivity along direction z, at least one of the gratings used for signal generation must be tilted relative to the xy plane.

An achromatic position measurement is basically understood to be a position measurement whose measurement result in the form of position phase $\Phi$ in the first order is independent of wavelength $\lambda$ of light:

$$\frac{d\Phi}{d\lambda} = 0$$

It is, therefore, decisive for the wavelength independence of the scanning processes according to an embodiment of the present invention that the two sub-beam bundles not have any optical path length difference $\Delta \Lambda$ between splitting and recombination, resulting in the optical path length in accordance with $$\Delta \Lambda = \Lambda 2 - \Lambda 1$$

where $\Lambda 1 :=$ the optical path length of the first sub-beam bundle, $\Lambda 2 :=$ the optical path length of the second sub-beam bundle.

The following will show that this condition is fulfilled for the scanning shown in FIGS. 9a, 9b, i.e., the optical path lengths of the two sub-beam bundles are identical there between splitting and recombination.

Thus, in accordance with FIGS. 9a, 9b, path length difference $\Delta \Lambda$ of the two sub-beam bundles between splitting and recombination is given by:

$$\Delta\Lambda=2\cdot(L2-L1).$$

Here, L1 und L2 denote the length of the sub-beam bundles between splitting point P0 on first scale M2 and points of incidence P11, respectively P12 on second scale M1.

In FIG. 9a, L0 denotes the connecting line of the two points P0 and Ps. P0 thereby indicates the splitting point and Ps the point of intersection of the bisectors of the two sub-beam bundles with the surface of second scale M1.

It is discernible that lengths L1 and L2 of the sub-beam bundles are equal in length, and thus that the path length difference is $\Delta\Lambda=0$ when the bisector is perpendicular to the connecting line of the two points of incidence P11 and P12. Because only then does it hold that:

$$L1=L0/\cos(\alpha 1)=L2=L0/\cos(\alpha 2) \text{ where } \alpha 1=\alpha 2.$$

Here, $\alpha 1$ denotes the angle of first diffraction branch L1 relative to the bisectors; $\alpha 2$ denotes the angle of second diffraction branch L2 relative to the angle bisectors.

Figure 1B:
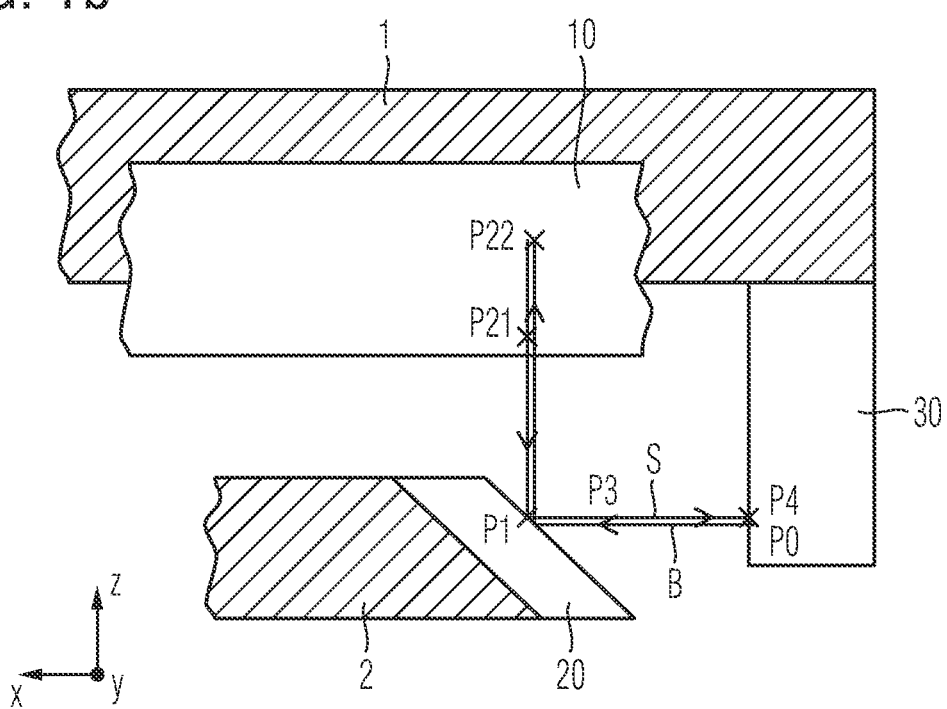
Figure 2A:
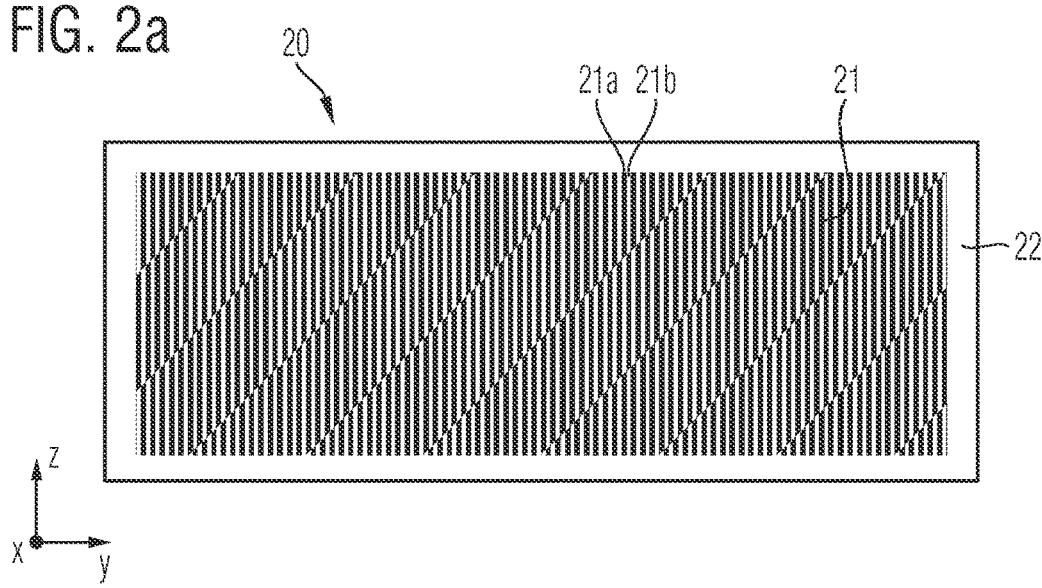
FIGS. 2a, 2b are each a plan view of the two measuring graduations used for the scales in the first exemplary embodiment of the optical position measuring device according to the present invention.
Figure 2B:
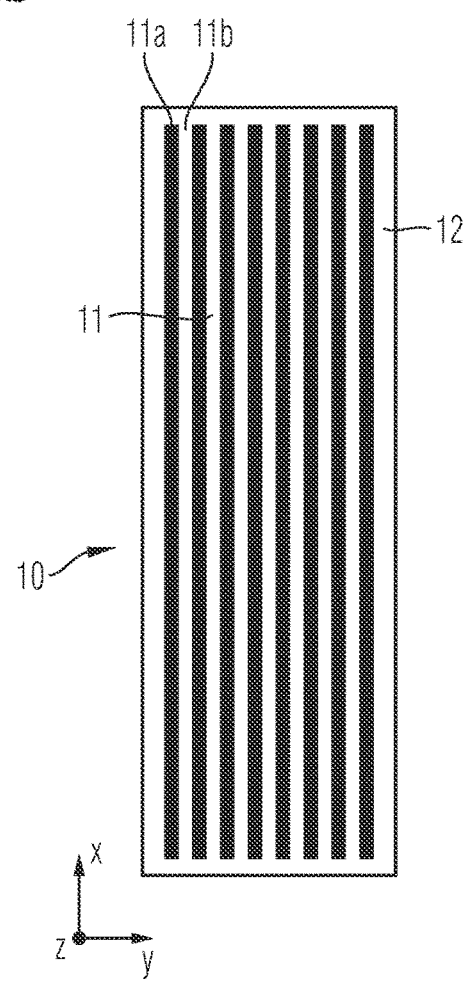

The following will clarify a first exemplary embodiment of the optical position measuring device according to the present invention with reference to FIGS. 1a, 1b, 2a, 2b and 3. FIGS. 1a, 1b thereby show various sectional views including the scanning beam path; FIGS. 2a, 2b plan views of the measuring graduations of the scales used; and FIG. 3 a representation of the scanning head of this position measuring device.

With the aid of this exemplary embodiment of the optical position measuring device according to the present invention, a wavelength-independent scanning may be realized where relative movements of the two scales 10, 20, respectively of—schematically indicated—machine components 1, 2, connected therewith may be determined metrologically along measuring directions y and z.

In the following, the direction designated x in the figures is denoted as the first measuring direction and direction y orthogonal thereto as the second measuring direction. In the present case, a horizontal plane of movement is spanned by measuring directions x, y; first scale 20 is movably disposed in this plane of movement or parallel thereto. Oriented perpendicularly to first and second measuring direction x, y, respectively orthogonally to the horizontal plane of movement is a vertical direction z, which is referred to below as third measuring direction z; also, first scale 20 is movably disposed along this direction.

It should be noted at this point that the designations horizontal, vertical, first, second and third measuring directions as well as above and below used in the present application should self-evidently not be construed to be limiting in any way.

In the present exemplary embodiment, first scale 20 is thus movably disposed along the three measuring directions x, y, z, relative to a stationary scanning head 30, which, in turn, is connected to second scale 10. Scanning head 30 includes, inter alia, a light source as well as a detection unit, FIG. 1a, 1b not showing any details in this regard. Further details on scanning head 30 are explained in the further course of the description with reference to FIG. 3.

In the illustrated example, the direction of the longitudinal extent of first scale 20 is oriented parallel to second measuring direction y; the direction of the longitudinal extent of second scale 10 is oriented parallel to first measuring direction x; the directions of the longitudinal extent of the two scales 10, 20 are thus oriented mutually orthogonally.

Along the direction of longitudinal extent y thereof, first scale 20 has a length that corresponds to the displacement path of first scale 20 along associated measuring direction y thereof. Along the direction of longitudinal extent x thereof, second scale 10 has a length that corresponds to the displacement path of first scale 20 along associated measuring direction x.

As is also apparent from FIGS. 1a and 1b, relative to the horizontal plane of movement, which is spanned by first and second measuring directions x, y, second scale 10 is tilted about the direction of the longitudinal extent thereof, which runs here in the x direction. With regard to the specified tilting of second scale 10, reference is made to the further description of this exemplary embodiment.

Moreover, in the present first exemplary embodiment, first scale 20 is also tilted about the direction of the longitudinal extent thereof in the y direction relative to the horizontal plane of movement; however, as is also readily apparent from the description of other exemplary embodiments, this measure is not essential to the present invention.

Not shown in FIG. 1a and FIG. 1b are the measuring graduations, which are provided on scales 10, 20 and are each composed of periodically arrayed grating regions having different optical properties. FIGS. 2a and 2b show plan views of the two scales 20, 10 including corresponding measuring graduations 21, 11. Provided in this exemplary embodiment as measuring graduations 21, 11 on scales 20, 10 are reflection phase gratings which have periodically arrayed grating regions 21a, 21b, respectively 11a, 11b, having different phase-shifting effects.

Scales 20, 10 each include a carrier body 22, 12, upon which measuring graduations 21, 11 are disposed. Carrier body 22, 12 is thereby preferably formed of a material having a coefficient of thermal expansion CTE≈0, for example, of a glass ceramic such as Zerodur.

Measuring graduations 11, 21 disposed on the carrier body have a multilayer structure. This may be composed, for example, of a metallic or dielectric mirror layer disposed on carrier body 12, 22, a phase-shifting layer as well as of a structured, reflective layer.

In the case of first scale 20, measuring graduation 21 shown in FIG. 2a having grating regions 21a, 21b is formed as a cross grating. In the present exemplary embodiment, this is obtained by superimposing two linear gratings. Here, the first of these linear gratings has a diffraction effect in the y direction; the second linear grating has a diffraction effect in the y direction, but at a lower intensity than the first linear grating; in addition, the second linear grating has a diffraction component in the x direction. The representation in FIG. 2a shows the binarized version of the cross grating resulting from the superimposition of the two linear gratings.

In second scale 10 and in accordance with the projection view into the xy plane in FIG. 2b, grating regions 11a, 11b of measuring graduation 11 are periodically arrayed perpendicularly to direction of longitudinal extent x and, thus, periodically along second measuring direction y. In the present exemplary embodiment, measuring graduation 21 of second scale 10 is formed as a Littrow grating, so that a beam incident thereto is back-reflected opposite to the direction of incidence. Alternatively, it may also be provided that the sub-beam bundles, projected into a plane spanned by the sub-beam bundle split at the first scale, are back-reflected opposite to the direction of incidence.

The scanning beam path of the first exemplary embodiment of the optical position measuring device according to the present invention will be explained in the following.

Illumination beam B emitted by the light source in scanning head 30 at point P0 parallel to first measuring direction x strikes point P1 on first scale 20 where a splitting into at least two sub-beam bundles, respectively orders of diffraction occurs via first measuring graduation 21. A corresponding splitting may take place at first measuring graduation 21 of the first line grating, for example, by a diffraction into the first diffraction order, with the diffraction effect solely in the y direction and a diffraction into the first diffraction order at the second line grating, with a combined diffraction effect in the y and x directions. The sub-beam bundles split in this way then propagate at identical angles α1, respectively α2 to a normal n and without beam shear in the xz projection (FIG. 1b) onto the surface of the second, tilted scale 10, in the direction of second scale 10. In other words: in the plane which is spanned by the sub-beam bundle split at first scale 20, the bisector between the split sub-beam bundles is perpendicular to the connecting line between points of incidence P21, P22 of the sub-beam bundles at second scale 10. Therefore, at points of incidence P21, P22, the sub-beam bundles impinge on second scale 10, respectively second measuring graduation 11. From points of incidence P21, P22, the sub-beam bundles are back-reflected by Littrow grating-type measuring graduation 11 of second scale 10 opposite to the direction of incidence to first scale 20 and are then recombined on first scale 20 at point P3. A resulting signal beam S subsequently propagates with the recombined, respectively superimposed sub-beam bundles antiparallel to illumination beam B in the direction of scanning head 30 and impinges at point P4 on the detection unit located there. Along second measuring direction y and third measuring direction z, a plurality of phase-shifted scanning signals indicative of the relative movement of scales 10, 120 may be generated by the detection unit and the detection of the signal beam.

Figure 3:
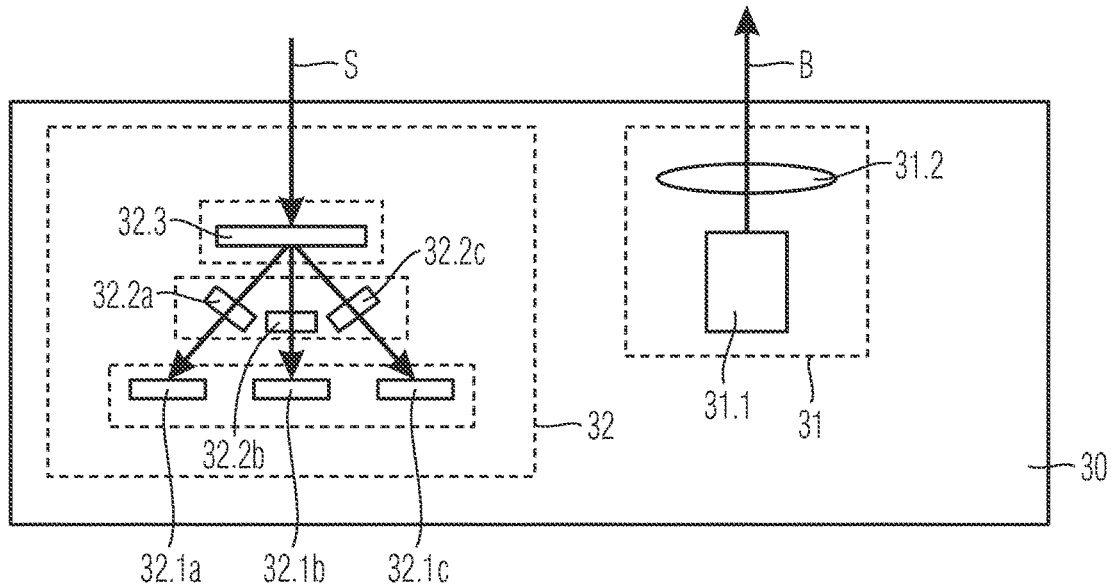
FIG. 3 is a schematic representation of the scanning head from the first exemplary embodiment of the optical position measuring device according to the present invention.

With regard to the detection unit generating the scanning signals, reference is made to the schematic representation of scanning head 30 in FIG. 3. Adjacently to an illumination unit 31 having a light source 31.1 and an upstream collimating optics 31.2 for generating illumination beam B, detection unit 32, used for generating a plurality of phase-shifted scanning signals from signal beam S, is disposed in scanning head 30. To this end, detection unit 32 includes a splitting element 32.3, for example, in the form of a grating which splits incident signal beam S into three sub-beam bundles, which then each propagate in the direction of a polarizer 32.2a-32.2c and then to a detector element 32.1a-32.1c situated downstream of corresponding polarizer 32.2a-32.2c. With the aid of detector elements 32.1a-32.1c, the sub-beam bundles are converted into three phase-shifted, periodic scanning signals, for example, into three scanning signals, which are mutually phase-shifted by 120°; the scanning signals may then be further processed in a known manner by a downstream machine controller.

As mentioned above, the described scanning beam path of the first exemplary embodiment of the optical position measuring device according to the present invention transmits scanning signals, which are sensitive to relative displacements of second scale 20 along second measuring direction y as well as third measuring direction z. This is indicated in FIG. 1a by sensitivity vector $\vec{EV}$; it indicates along which measuring direction(s), a grating-based optical position measuring device is sensitive to position changes.

As is readily apparent from the figure, sensitivity vector $\vec{EV}$ here has both a component in the y direction and in the z direction; therefore, the corresponding position measuring device is sensitive to changes in position in these measuring directions.

Besides the desired sensitivity of the position measurement along the two measuring directions y and z, the described first exemplary embodiment of the optical position measuring device according to the present invention also ensures the wavelength-independence of the position measurement. This is ensured by a suitable tilting of second scale 10 by the bisector between the split sub-beam bundles being perpendicular to the connecting line between points of incidence P21, P22 of the sub-beam bundles at second scale 10, in the plane, which is spanned by the sub-beam bundles split at first scale 20.

In a variant of the first exemplary embodiment, a beam splitter element may also be incorporated in scanning head 30 according to FIG. 3. According to this variant, it is possible to ensure that sub-beam bundle B propagating from first scale 20 in the direction of scanning head 30 impinges on the detection unit at a point P4 which is spatially separate from point P0 of emitted signal beam S.

It is also possible that one of the scales has a measuring graduation, which has a polarizing effect on beams incident thereon, so that different polarization states result in the sub-beam bundles diffracted by it. For this purpose, one of the measuring graduations may be in the form of a geometric phase grating which effects a mutually orthogonal polarization of the sub-beam bundles diffracted by it.

A second exemplary embodiment of the optical position measuring device according to the present invention will be described below with reference to FIGS. 4a, 4b as well as 5a and 5b. Analogously to the first exemplary embodiment, these show schematized sectional views for clarifying the scanning beam path as well as plan views of the scales used, respectively a corresponding projection view into the xy plane.

With the aid of this exemplary embodiment of the optical position measuring device according to the present invention, a wavelength-independent scanning may be realized where relative movements of the two scales 110, 120, respectively of—again schematically indicated—machine components 101, 102 connected therewith may be determined metrologically along measuring directions x and z.

In this example, the direction indicated by x in the figures is denoted as the first measuring direction and the direction orthogonal thereto as direction y, a horizontal plane of movement being spanned by measuring direction x and direction y. In this plane of movement or parallel thereto, second scale 110 is movably disposed along direction y. Moreover, second scale 110 is also movably disposed along third measuring direction z, which, in turn, is oriented perpendicularly to both other directions x, y.

First scale 120 is connected to a stationary machine component 102. In contrast to the previous exemplary embodiment, scanning head 130 here is connected to another machine component 103, which is movable along first measuring direction x. With regard to the design and function of scanning head 130, reference is made to the previous example.

In this exemplary embodiment, the direction of longitudinal extent of first scale 120 is oriented parallel to first measuring direction x; the direction of longitudinal extent of second scale 110 is oriented parallel to second measuring direction y; the directions of longitudinal extent of the two scales 110, 120 are thus oriented mutually orthogonally.

In this exemplary embodiment, first scale 120 has a length along direction of longitudinal extent x thereof that corresponds to the displacement path of second scale 110 along associated measuring direction x thereof. Along the direction of longitudinal extent y thereof, second scale 110 has a length that corresponds to the displacement path of second scale 110 along associated measuring direction y.

Figure 4A:
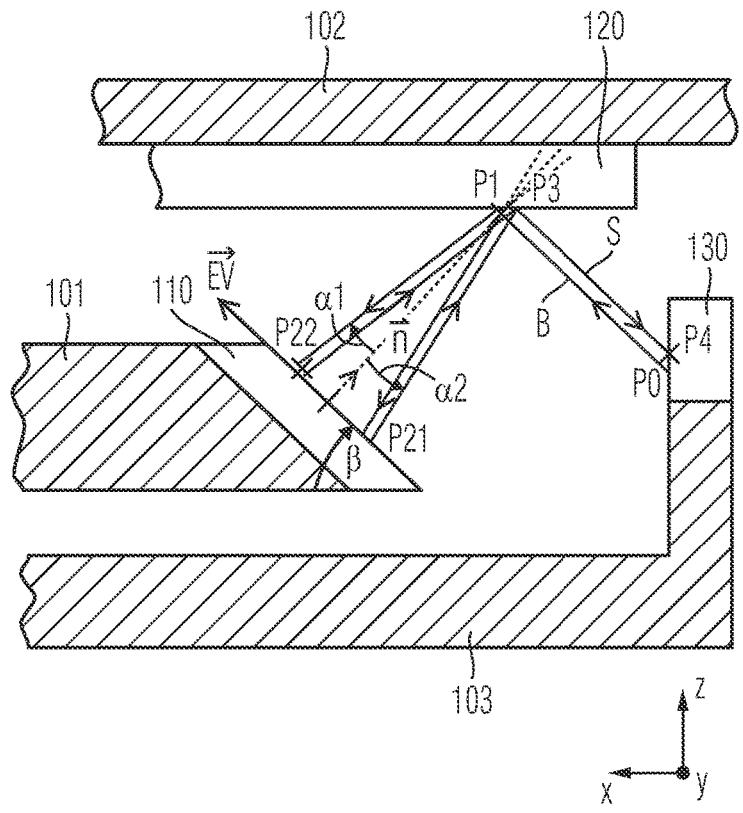
FIGS. 4a, 4b each show a schematic sectional view including the scanning beam path of a second exemplary embodiment of the optical position measuring device according to the present invention.
Figure 4B:
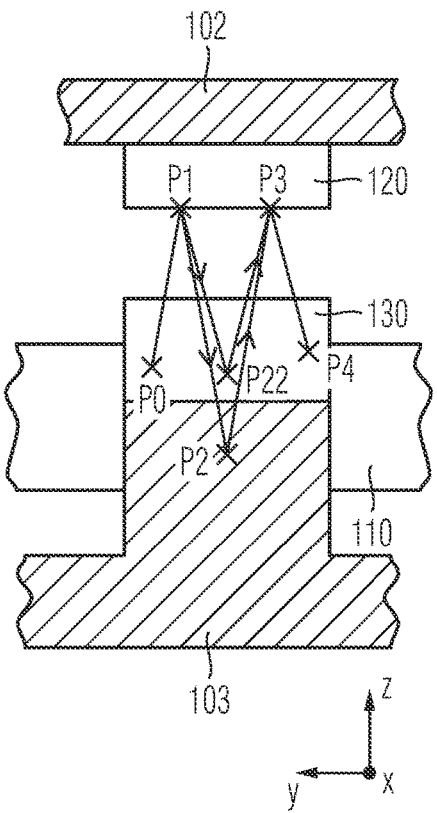

In this exemplary embodiment as well and as is apparent from FIG. 4a, relative to first scale 120 and the horizontal plane of movement, which is spanned by first measuring direction x and direction y, second scale 110 is tilted about the direction of longitudinal extent thereof in the y direction, in the scanning beam path. With regard to the tilting of second scale 110, reference is made to the explanations for the previous exemplary embodiment.

Figure 5A:
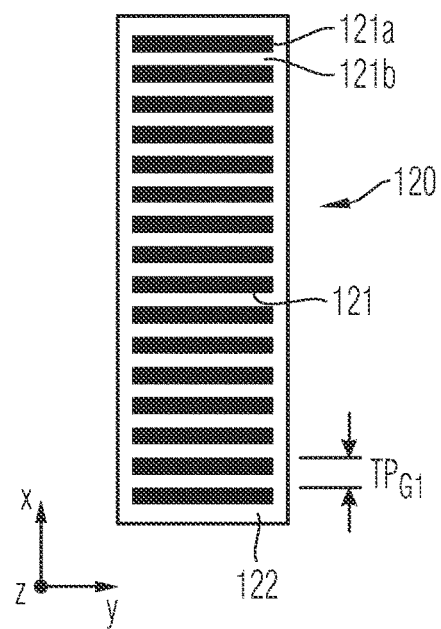
FIGS. 5a, 5b each show a plan view of the two measuring graduations used for the scales in the second exemplary embodiment of the position measuring device according to the present invention.
Figure 5B:
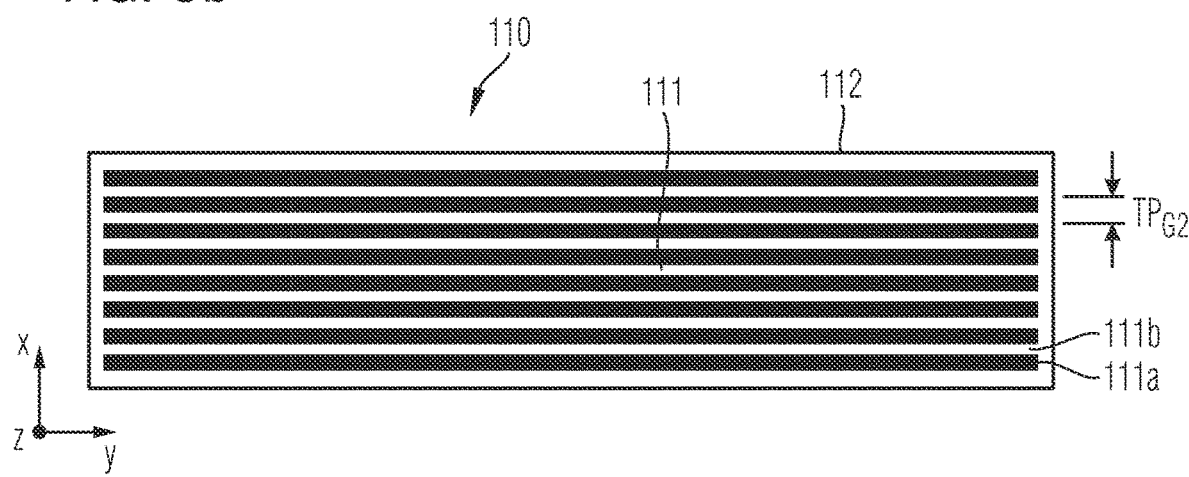

FIG. 5a shows a plan view of first scale 120 having corresponding measuring graduations 121; analogously to the preceding example, FIG. 5b illustrates a projection of second scale 110 where measuring graduation 111 thereof is projected into the xy plane. In this exemplary embodiment as well, provided as measuring graduations 121, 111 on scales 120, 110 are reflection phase gratings in each case, which have periodically arrayed grating regions 121a, 121b, respectively 111a, 111b having different phase-shifting effects.

Scales 120, 110 each include, in turn, a carrier body 122, 112, upon which measuring graduations 121, 111 are disposed, which may basically be formed as in the first exemplary embodiment. In this example as well, carrier body 122, 112 is preferably made of a material having a coefficient of thermal expansion of CTE≈0.

As is apparent from FIG. 5a, grating regions 121a, 121b of measuring graduation 121 are periodically arrayed on first scale 120, along direction of longitudinal extent x thereof. In accordance with FIG. 5b and in the case of second scale 110, grating regions 111a, 111b of measuring graduation 111 are periodically arrayed perpendicularly to direction of longitudinal extent y and, thus, periodically along third measuring direction z.

In this exemplary embodiment as well, measuring graduation 121 of second scale 120 is formed as a Littrow grating, so that a beam incident thereto is back-reflected opposite to the direction of incidence.

By suitably selecting grating period $TP_{G2}$ of measuring graduation 111 of second scale 110, it is ensured here that the directional component of the beam remains unchanged in the y direction during the diffraction and backreflection of sub-beam bundles incident thereon. To this end, the grating period $TP_{G2}$ is selected as follows:

$$TP_{G2} = TP_{G1} \cdot (\cos \beta)/2$$

$TP_{G1}$ thereby indicates the grating period of measuring graduation 121 on first scale 120 and, in accordance with FIG. 4a, β the angle by which second scale 110 is tilted from the horizontal.

The scanning beam path of the second exemplary embodiment of the optical position measuring device according to the present invention is clarified in the following.

Illumination beam B emitted by the light source in scanning head 130 at point P0 strikes at point P1 on first scale 120, respectively on measuring graduation 121 disposed thereon, in contrast to the first exemplary embodiment, an oblique illumination of first scale 120 being provided here. Analogously to the first exemplary embodiment, illumination beam B is split into at least two sub-beam bundles or orders of diffraction via first measuring graduation 121. The split sub-beam bundles then propagate in the direction of second scale 110 in the xz plane of projection in accordance with FIG. 4a at identical angles α1, respectively α2 to a normal $\vec{n}$ onto the surface of second, tilted scale 110. At points of incidence P21, P22, the sub-beam bundles then impinge on second scale 10, respectively second measuring graduation 11. From points of incidence P21, P22, the sub-beam bundles are back-reflected in the xz plane of projection by Littrow grating-type measuring graduation 111 of second scale 110 opposite to the direction of incidence of first scale 120 and are subsequently recombined on first scale 120 at point P3. A resulting signal beam S subsequently propagates with the recombined, respectively superimposed sub-beam bundles antiparallel to illumination beam B in the direction of scanning head 130 and impinges at point P4 on the detection unit located there. Along first measuring direction x and third measuring direction z, a plurality of phase-shifted scanning signals indicative of the relative movement of scales 110, 120 may be generated by the detection unit and the detection of the signal beam.

This is again indicated in FIG. 4a via sensitivity vector $\vec{EV}$ of this exemplary embodiment of the optical position measuring device according to the present invention. As is readily apparent from the figure, sensitivity vector $\vec{EV}$ here has both a component in the x direction as well as in the z direction.

Besides the desired sensitivity of the position measurement along the two measuring directions x and z, this exemplary embodiment of the optical position measuring device according to the present invention also ensures the wavelength-independence thereof. Analogously to the first exemplary embodiment, this is again ensured by a suitable tilting of second scale 110 in the scanning beam path.

Due to the offset that the sub-beam bundles undergo in this exemplary embodiment perpendicularly to measuring direction x, there is additionally no need for a beam splitter element here to ensure that signal beam B propagating from first scale 120 in the direction of scanning head 130 impinges on the detection unit at a point which is spatially separate from the point of emitted signal beam S.

Figure 6A:
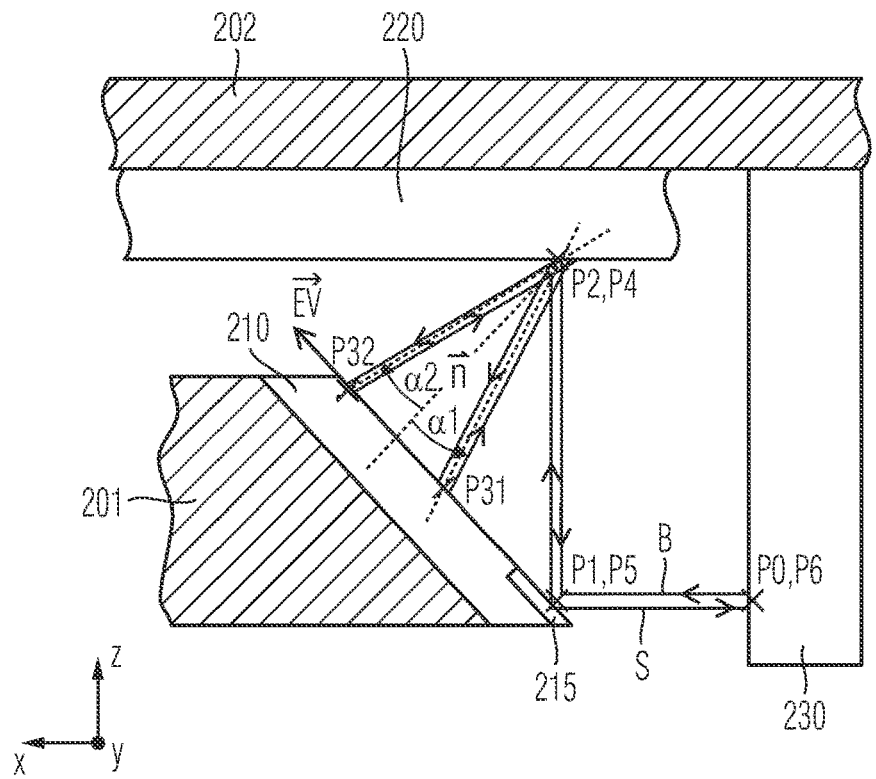
FIGS. 6a, 6b each show a schematic sectional view including the scanning beam path of a third exemplary embodiment of the optical position measuring device according to the present invention.
Figure 6B:
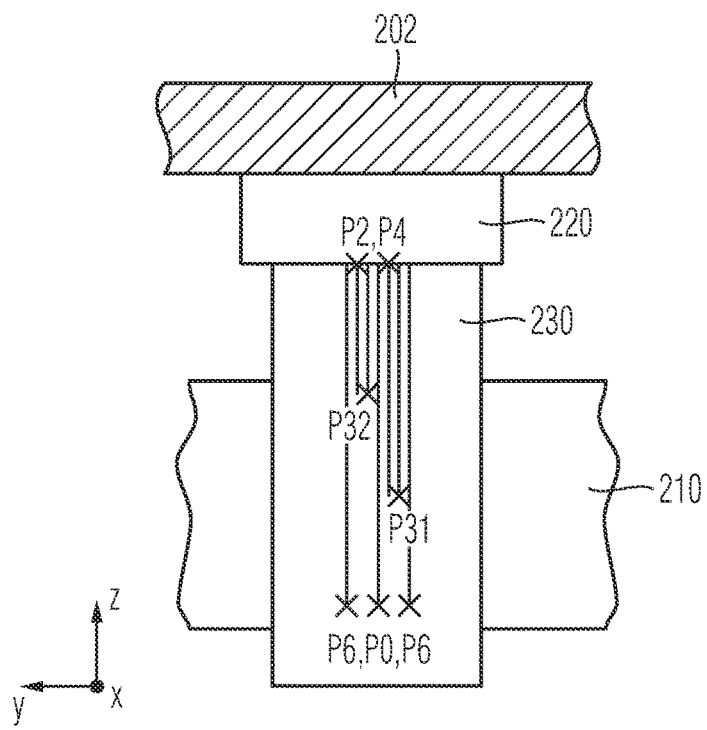

The following will clarify a third exemplary embodiment of the optical position measuring device according to the present invention with reference to FIGS. 6a and 6b. Analogously to the other two exemplary embodiments, these figures show schematized sectional views for clarifying the scanning beam path.

This exemplary embodiment of the optical position measuring device according to the present invention as well ensures a wavelength-independent scanning; thus, relative movements of the two scales 210, 220, respectively of machine components 201, 202 connected thereto may be determined metrologically along measuring directions x and z.

In the following, the direction denoted as x in the figures is denoted as the first measuring direction, and direction y orthogonal thereto as the second measuring direction; a horizontal plane of movement being spanned, in turn, by measuring directions x, y. In this plane of movement or parallel thereto, second scale 210 is movably disposed in the present case along first and second measuring directions x, y. Moreover, second scale 210 is also movably disposed along third measuring direction z, which, in turn, is oriented perpendicularly to both other measuring directions x, y.

Relative to second scale 210, first measuring scale 220 is connected to a stationary machine component 202. In this exemplary embodiment, scanning head 230 is also connected to stationary first scale 220. With regard to the design and function of scanning head 230, reference is made to the first exemplary embodiment described above.

In this exemplary embodiment, the direction of longitudinal extent of first scale 220 is oriented parallel to first measuring direction x; the direction of the longitudinal extent of second scale 210 parallel to second measuring direction y; the directions of the longitudinal extent of the two scales 210, 220 are, again, thus oriented mutually orthogonally.

In this example, first scale 220 has a length along direction of longitudinal extent x thereof that corresponds to the displacement path of second scale 210 along associated measuring direction x thereof. Along the direction of longitudinal extent y thereof, second scale 210 has a length that corresponds to the displacement path of second scale 210 along associated measuring direction y.

In accordance with FIG. 6a and in this exemplary embodiment as well, second scale 210 is tilted about the direction of the longitudinal extent thereof in the y direction relative to first scale 220 and the horizontal plane of movement, which is spanned by first and second measuring directions x, y. With regard to the tilting of second scale 210, reference is made to the description of the first exemplary embodiment.

Scales 210, 220 used in the third exemplary embodiment and the measuring graduations correspond to those from the second exemplary embodiment which are shown in FIGS. 5a and 5b and to which reference is hereby expressly made.

The following clarifies the scanning beam path of the third exemplary embodiment of the optical position measuring device according to the present invention.

Illumination beam B emitted by the light source in scanning head 230 at point P0 strikes at point P1 onto a reflector area 215 disposed on second scale 210 where the illumination beam is deflected in the direction of first scale 220. At point P2, illumination beam B then strikes first scale 220 where, analogously to the preceding exemplary embodiments, a splitting into at least two sub-beam bundles, respectively orders of diffraction occurs via the first measuring graduation. In accordance with FIG. 6a, the split sub-beam bundles then propagate in the direction of second scale 210 at identical angles α1, respectively α2 to a normal $\vec{n}$ onto the surface of second, tilted scale 210. At points of incidence P31, P32, the sub-beam bundles then impinge on second scale 210, respectively second measuring graduation. From points of incidence P31, P32, the sub-beam bundles are back-reflected in the xz plane of projection by the Littrow grating-type measuring graduation of second scale 210 opposite to the direction of incidence of first scale 220 and are subsequently recombined on first scale 220 at point P4. A resulting signal beam S subsequently propagates with the recombined, respectively superimposed sub-beam bundles antiparallel to illumination beam B over to reflector area 215 on second scale 210 where it impinges at point P5. There, a deflection in the direction of scanning head 230 results where signal beam S impinges at point P6 onto the detection unit located there. Along first measuring direction x and third measuring direction z, a plurality of phase-shifted scanning signals indicative of the relative movement of scales 210, 220 may then be generated by the detection unit and the detection of signal beam S.

FIG. 6a indicates sensitivity vector $\vec{EV}$ from which it proceeds along which measuring direction, this exemplary embodiment of the optical position measuring device according to the present invention is sensitive to changes in position. In accordance with FIG. 6a, sensitivity vector $\vec{EV}$ here has both a component in the x direction as well as in the z direction.

Besides the desired sensitivity of the position measurement along the two measuring directions x and z, this exemplary embodiment of the optical position measuring device according to the present invention also ensures the wavelength-independence of the position measurement. This is again ensured by a suitable tilting of second scale 210, analogously to the first exemplary embodiment.

Finally, a fourth exemplary embodiment of the optical position measuring device according to the present invention will be described with reference to FIGS. 7a and 7b, which, analogously to the other exemplary embodiments, show schematized sectional views for explaining the scanning beam path.

A wavelength-independent scanning is also ensured in this exemplary embodiment of the optical position measuring device according to the present invention. Relative movements of the two scales 310, 320, respectively of machine components 301, 302 connected therewith may hereby be determined metrologically along measuring directions y and z.

Here as well, the direction designated x in the figures is denoted in the following as the first measuring direction and direction y orthogonal thereto as the second measuring direction, a horizontal plane of movement being spanned, in turn, by measuring directions x, y. In this exemplary embodiment, scanning head 330 connected to a machine component 303 is movably disposed along first measuring direction x in this plane of movement or parallel thereto; scanning head 330 is disposed on machine component 303 that is movable along measuring direction x. Thus, in this exemplary embodiment, scanning head 330 is neither connected to first scale 320 nor to second scale 310. With regard to the design and function of scanning head 230, reference is made to the first exemplary embodiment described above.

Relative to second scale 310, first scale 320 is movably disposed on machine component 302; in the present case, a movability of first scale 320 along second measuring direction y being provided. Second scale 310 is connected to a stationary machine component 301.

In this exemplary embodiment, the direction of longitudinal extent of first scale 320 is oriented parallel to second measuring direction y; the direction of the longitudinal extent of second scale 310 parallel to first measuring direction x; the directions of the longitudinal extent of the two scales 310, 320 are, again, thus oriented mutually orthogonally.

In this exemplary embodiment, first scale 320 has a length along direction of longitudinal extent y thereof that corresponds to the displacement path of first scale 320 along associated measuring direction y thereof. Along the direction of longitudinal extent x thereof, second scale 310 has a length that corresponds to the displacement path of first scale 320 along associated measuring direction x.

Figure 7A:
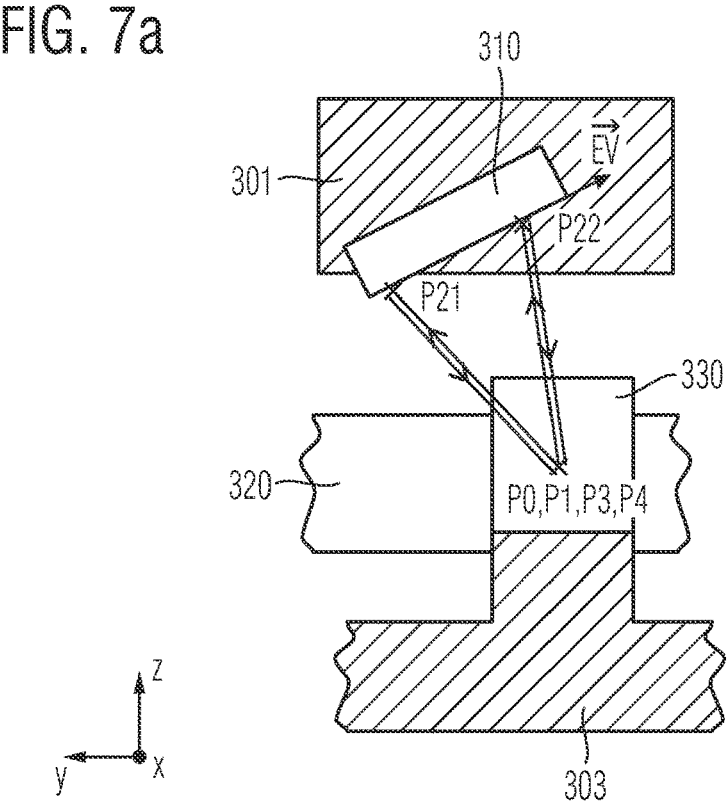
FIGS. 7a, 7b each show a schematic sectional view including the scanning beam path of a fourth exemplary embodiment of the optical position measuring device according to the present invention.
Figure 7B:
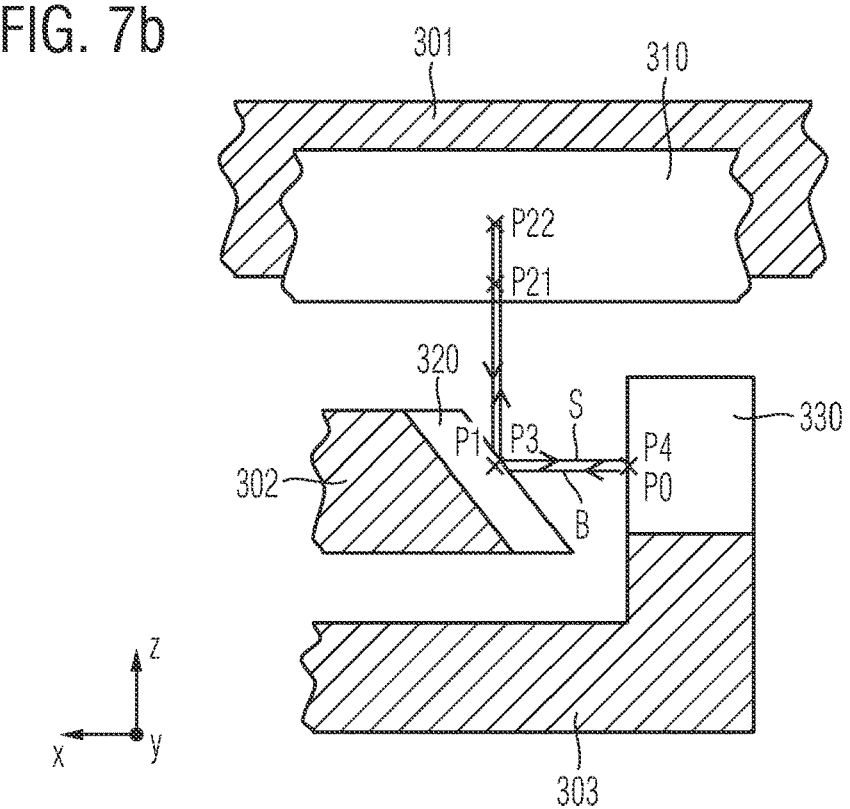

In accordance with FIG. 7a and in this exemplary embodiment, second scale 310 is tilted about the direction of the longitudinal extent thereof in the x direction relative to first scale 310 and the horizontal plane of movement, which is spanned by first and second measuring directions x, y. With regard to the tilting of second scale 310, reference is made to the description of the first exemplary embodiment.

Scales 310, 320 and measuring graduations used in the fourth exemplary embodiment are identical to the first exemplary embodiment explained.

The scanning beam path of the fourth exemplary embodiment of the optical position measuring device according to the present invention will be explained in the following.

Illumination beam B emitted by the light source in scanning head 330 at point P0 parallel to first measuring direction x strikes point P1 on first scale 320 where it is split by first measuring graduation into at least two sub-beam bundles, respectively orders of diffraction. The split sub-beam bundles then propagate in the direction of second scale 310 at identical angles α1, respectively α2 to a normal $\vec{n}$ onto the surface of second, tilted scale 310. At points of incidence P21, P22, the sub-beam bundles then impinge on second scale 310, respectively second measuring graduation disposed thereon. From points of incidence P21, P22, the sub-beam bundles are back-reflected by the Littrow grating-type measuring graduation of second scale 310 again opposite to the direction of incidence of first scale 320 and are subsequently recombined on first scale 320 at point P3. A resulting signal beam S subsequently propagates with the recombined, respectively superimposed sub-beam bundles antiparallel to illumination beam B in the direction of scanning head 330 and impinges at point P4 on the detection unit located there. A plurality of scanning signals, which are phase-shifted in response to the relative movement of scales 310, 320, may be generated along second measuring direction y and third measuring direction z by the detection unit and the detection of the signal beam.

Likewise indicated in FIG. 7a is sensitivity vector $\vec{EV}$ from which it proceeds along which measuring direction, this exemplary embodiment of the optical position measuring device according to the present invention is sensitive to changes in position. In accordance with FIG. 7a, sensitivity vector $\vec{EV}$ here has both a component in the y direction as well as in the z direction.

Besides the desired sensitivity of the position measurement along the two measuring directions y and z, this exemplary embodiment of the optical position measuring device according to the present invention also ensures the wavelength-independence of the position measurement. Analogously to the first exemplary embodiment, this is again ensured by a suitable tilting of second scale 310.

On the one hand, the exemplary embodiments of optical position measuring devices according to the present invention explained above thus each provide displacement information regarding a first measuring direction x or a second measuring direction y; the two measuring directions x, y are each oriented mutually orthogonally in a horizontal plane of movement. Additionally, a sensitivity of the respective position measuring device to changes in position along a third measuring direction z is provided, which is oriented perpendicularly to the orthogonal plane of movement. This means that, on the other hand, displacement information regarding third measuring direction z is also available. Thus, two linear spatial degrees of freedom of two mutually movable objects may be determined metrologically in each particular case, using each of the described position measuring devices. Moreover, by suitably combining a plurality of position measuring devices according to the present invention, it is possible to metrologically determine all six possible degrees of freedom of movement of two mutually movable objects in space; these are the translational movements along measuring directions x, y, z as well as the rotational movements about measuring directions x, y, z. With reference to the highly schematized representation in FIG. 8, the following exemplarily outlines how, in the case of a manufacturing device, for instance, the position of a tool T relative to a table W may be recorded in all six spatial degrees of freedom of movement with the aid of four inventive position measuring devices. The manufacturing device may be a photolithographic system, for example, where a semiconductor wafer situated on table W is positioned relative to tool T, which is in the form of an exposure optics.

In the illustrated manufacturing device, the first exemplary embodiment explained above provides altogether four position measuring devices, which are used to record the spatial position of tool T relative to table W in all six spatial degrees of freedom of movement. Here, table W is movably disposed relative to the tool along the three measuring directions x, y, z; in this case, measuring directions x, y represent the main directions of movement; a smaller displacement is possible along measuring direction z. Moreover, slight rotational movements of the table about the three measuring directions x, y, z are still possible.

In this case, a first position measuring device includes a scanning head AK1, a first scale $M1_1$, which extends in the y direction, and a second, tilted scale $M14_2$ which extends in the x direction. First scale $M1_1$ is disposed on a first side of table W; scanning head AK1 and second scale $M14_2$ are connected to tool T. The positions, respectively measured quantities m1, m2 are determined with the aid of the first position measuring device; here, there is a sensitivity of the corresponding first position measuring device to relative movements of tool T and table W along measuring directions y and z.

The second position measuring device includes a scanning head AK2, a first scale $M23_1$, which extends in the x direction, and a second, tilted scale $M2_2$ which extends in the y direction. First scale $M23_1$ is disposed on a second side of table W; scanning head AK2 and second scale $M2_2$ are connected to tool T. The positions, respectively measured quantities m3, m4 are determined with the aid of the second position measuring device; here, there is a sensitivity of the corresponding second position measuring device to relative movements of tool T and table W along measuring directions x and z.

The third position measuring device includes a scanning head AK3, a first scale $M23_1$, which extends in the x direction, and a tilted, second scale $M3_2$, which extends in the y direction. Accordingly, the second and third position measuring devices jointly use same scale M231 as first scale in the scanning beam path which is disposed on the second side of table W. Scanning head AK3 as well as second scale $M3_2$ are connected to tool T. The positions, respectively measured quantities m5, m6 are determined with the aid of the third position measuring device; here, there is a sensitivity of the corresponding third position measuring device to relative movements of tool T and table W along measuring directions x and z.

The fourth position measuring device includes a scanning head AK4, a first scale $M3_1$, which extends in they direction, and a tilted, second scale $M14_2$ which extends in the x direction. Accordingly, the first and fourth position measuring devices jointly use the same scale $M14_2$ as a tilted second scale in the scanning beam path. First scale $M3_1$ is disposed on a third side of table W; scanning head AK4 as well as second scale $M14_2$ are connected to tool T. The positions, respectively measured quantities m7, m8 are determined with the aid of the third position measuring device; here, there is a sensitivity of the corresponding fourth position measuring device to relative movements of tool T and table W along measuring directions y and z.

Thus, the spatial position of tool T relative to table W may be determined in all six spatial degrees of freedom of movement from the positions, respectively measured quantities m1-m8 obtained and the combination of the combination of the same.

It is particularly advantageous here, inter alia, that a functional surface is required on table W merely on three sides, on which first scale $M1_1$, $M23_1$, $M4_1$ of the various position measuring devices is disposed in each case. Moreover, no further elements for position sensing are required on table W.

Figure 8:
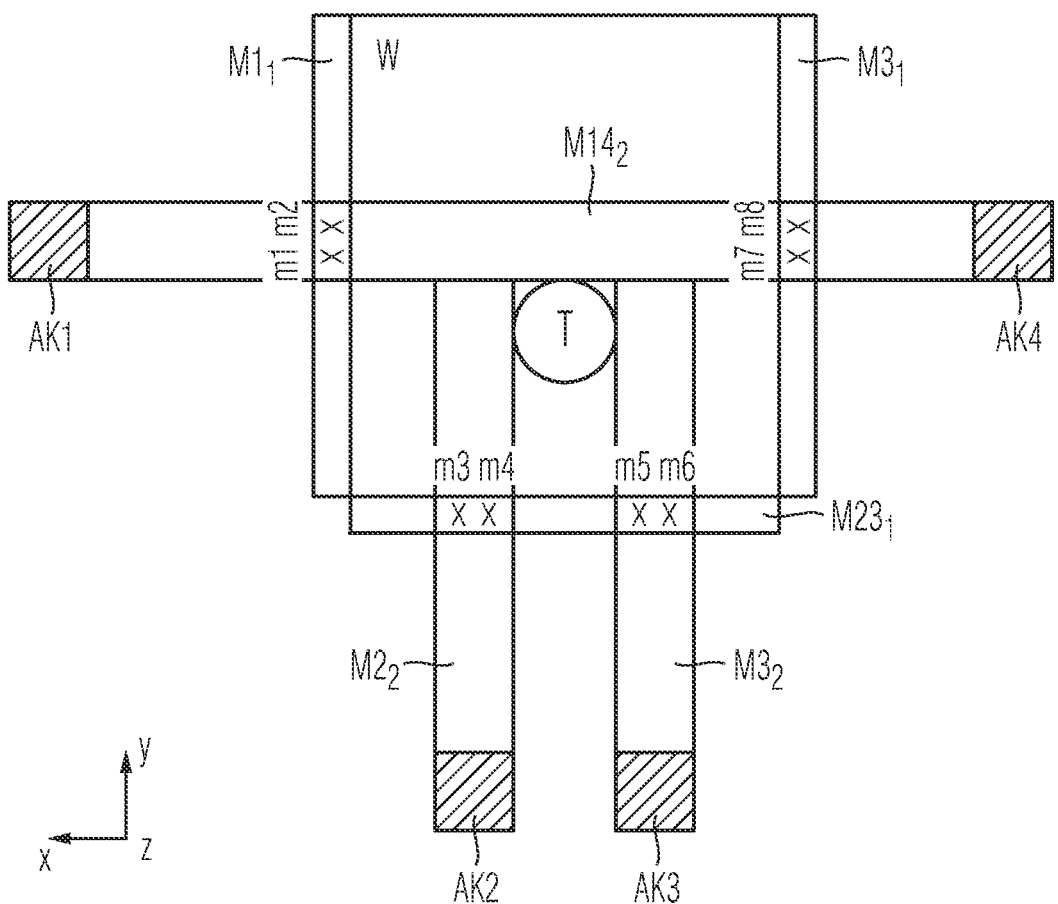
FIG. 8 is a highly schematized plan view of a manufacturing device having a plurality of position measuring devices according to the present invention.

The configuration of a plurality of position measuring devices according to the present invention in a manufacturing device explained with reference to FIG. 8 is self-evidently only to be understood exemplarily. Moreover, there are a variety of other possible ways to configure and combine the position measuring devices according to the present invention among themselves, respectively with other known position measuring devices, which may be used in corresponding manufacturing devices and machines, in order to metrologically determine the relative position of mutually movable components in a plurality of spatial degrees of freedom.

In addition to the specifically described exemplary embodiments, it is self-evident that other embodiments of the inventive, optical position measuring device are possible in the context of the present invention.

Thus, on the scales, it is possible to use measuring graduations in the form of polarization gratings, respectively geometric phase gratings, which polarize the two sub-beam bundles mutually orthogonally. In this manner, polarization-optical methods may be used to generate the phase-shifted signals. With regard to corresponding measuring graduations, reference is made here to German Patent Application no. DE 10 2019 206 937.1 of the Applicant.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position measuring device for recording a relative position of two scales which are mutually movable along a plurality of measuring directions and/or which are disposed in different planes and mutually crossed, the optical position measuring device comprising:
the two scales each having a measuring graduation that includes periodically arrayed grating regions having different optical properties, wherein:
directions of longitudinal extent of the scales are oriented parallel to a first and second measuring direction,
a horizontal plane of movement is spanned by the first and second measuring directions, and
a third measuring direction is oriented perpendicularly to the first and second measuring directions; and
a light source configured to emit an illumination beam that is split into at least two sub-beam bundles at a first one of the two scales, wherein:
the sub-beam bundles subsequently impinge on a second one of the two scales, which is tilted about the direction of the longitudinal extent thereof relative to the horizontal plane of movement,
the sub-beam bundles are back-reflected toward the first scale at the second scale, and
the back-reflected sub-beam bundles impinge again on the first scale and are recombined at the first scale such that a resulting signal beam is subsequently propagated in a direction of a detector, via which a plurality of phase-shifted scanning signals are generatable with respect to a relative movement of the scales along the third measuring direction and the first or second measuring direction.

2. The optical position measuring device as recited in claim 1, wherein the second scale is tilted about the direction of the longitudinal extent thereof relative to the horizontal plane of movement in such a way that, in a plane spanned by the sub-beam bundle split at the first scale, a bisector between the split sub-beam bundles is perpendicular to a connecting line between points of incidence of the sub-beam bundles at the second scale.

3. The optical position-measuring device as recited in claim 1, wherein the two measuring graduations on the scales are in the form of reflection phase gratings, which have periodically arrayed grating regions having different phase-shifting effects.

4. The optical position measuring device as recited in claim 3, wherein the two scales each include a carrier body on which the measuring graduations are arrayed, and wherein the carrier body is formed of a material having a coefficient of thermal expansion of CTE≈0.

5. The optical position measuring device as recited in claim 1, wherein at least one of the two measuring graduations is in the form of a geometric phase grating that polarizes the two sub-beam bundles mutually orthogonally.

6. The optical position measuring device as recited in claim 1, wherein the measuring graduation of the second scale is formed as a Littrow grating such that one of:
the sub-beam bundles, which are incident thereto, are back-reflected opposite to the direction of incidence, or
the sub-beam bundles, which are projected onto a plane spanned by a normal to the measuring graduation of the second scale and a direction of diffraction of the measuring graduation of the first scale, are back-reflected opposite to the direction of incidence.

7. The optical position measuring device as recited in claim 1, wherein the directions of longitudinal extent of the first and second scales are oriented mutually orthogonally.

8. The optical position measuring device as recited in claim 1, wherein:
the first scale has a length along the direction of longitudinal extent that corresponds to a displacement path of the first scale along an associated one of the first and second measuring directions, and the second scale has a length along the direction of longitudinal extent that corresponds to a displacement path of the first scale along an associated one of the first and second measuring directions.

9. The optical position measuring device as recited in claim 1, wherein:

the first scale has a length along the direction of longitudinal extent that corresponds to a displacement path of the second scale along an associated one of the first and second measuring directions; and the second scale has a length along the direction of longitudinal extent that corresponds to a displacement path of the second scale along an associated one of the first and second measuring directions.

10. The optical position measuring device as recited in claim 1, wherein the light source and the detector are jointly located in a scanning head.

11. The optical position measuring device as recited in claim 10, wherein:

the scanning head is neither connected to the first nor to the second scale and is movably disposed relative to the first scale along the first measuring direction, and the second scale is disposed relatively movably relative to the first scale along the second and third measuring directions.

12. The optical position measuring device as recited in claim 10, wherein:

the scanning head is connected to the first scale, and the second scale is disposed relatively movably relative to the scanning head along the first, second and third measuring directions.

13. The optical position measuring device as recited in claim 10, wherein the scanning head is neither connected to the first nor to the second scale and is movably disposed relative to the second scale along the first measuring direction, and the first scale is disposed relatively movably relative to the second scale along the second and third measuring directions.

14. The optical position measuring device as recited in claim 10, wherein:

the scanning head is connected to the second scale, the first scale is disposed relatively movably relative to the scanning head along the first, second and third measuring directions, and the first scale is tilted about the direction of the longitudinal extent thereof relative to the horizontal plane of movement.

15. The optical position measuring device as recited in claim 14, wherein the signal beam is oriented antiparallel to the illumination beam.

16. A manufacturing device comprising:

four of the position measuring devices as recited in claim 14; and a tool and a table which is disposed linearly displaceably relative to the tool along the first, second and third measuring directions and rotationally movably about the first, second and third measuring directions, wherein the scanning heads and the second scale of the position measuring devices are each connected to the tool, and the first scale of the position measuring devices are each connected to the table, such that the manufacturing device is configured to determine spatial position of the table relative to the tool in all six spatial degrees of freedom from scanning signals of the position measuring devices.

* * * * *